(No Model.)

C. F. HILL.
BUTTER PACKAGE.

No. 440,156. Patented Nov. 11, 1890.

Witnesses:
Lew E. Curtis
H. W. Munday

Inventor:
Charles F. Hill
By Munday, Evarts & Adcock
his Attorneys

THE NORRIS PETERS CO., PHOTO-LITHO., WASHINGTON, D. C.

UNITED STATES PATENT OFFICE.

CHARLES F. HILL, OF SPRINGFIELD, WISCONSIN.

BUTTER-PACKAGE.

SPECIFICATION forming part of Letters Patent No. 440,156, dated November 11, 1890.

Application filed December 9, 1889. Serial No. 333,038. (No model.)

*To all whom it may concern:*

Be it known that I, CHARLES F. HILL, a citizen of the United States, residing at Springfield, in the county of Walworth and State of Wisconsin, have invented a new and useful Improvement in Butter-Packages, of which the following is a specification.

It has been my intention in this invention to provide a form of butter-package which shall be substantially air-tight, and which will permit the keeping of the butter for long periods of time free from the action of the atmosphere, and in which the butter may also be shipped and sold.

My package consists of two earthenware vessels nearly equal in size, provided with a compressible gasket or packing interposed between them, and a fastening adapted to serve the double function of holding the two vessels together and of exerting such pressure upon the gasket as will exclude the air. These and other features of my package will be better understood from the accompanying drawings, in which—

Figure 1:
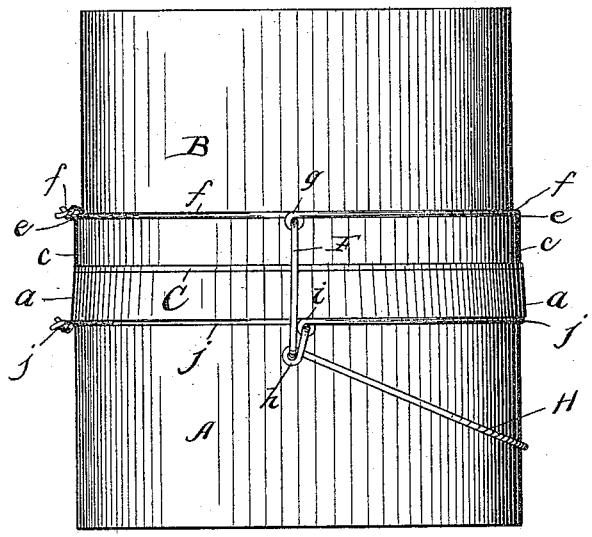
Figure 2:
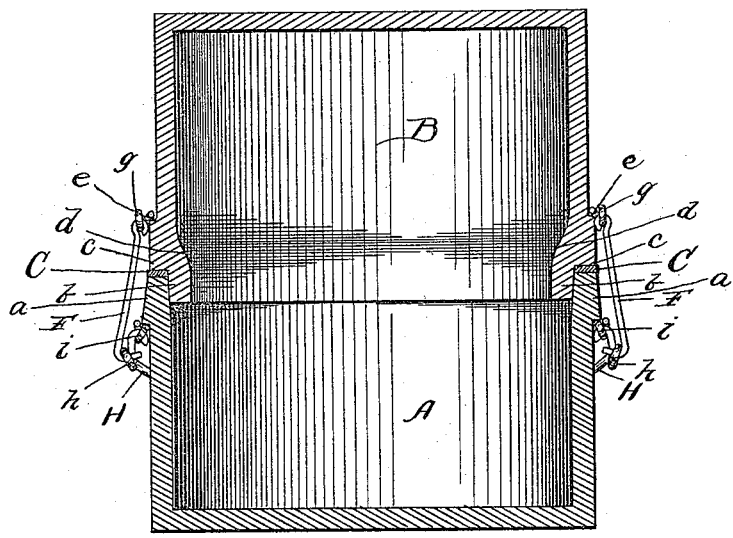

Figure 1 is a side elevation of my improved package; and Fig. 2, a central vertical section thereof, taken at right angles to Fig. 1.

In said drawings, A represents an earthenware tub or firkin, which may be very similar to those ordinarily used for packing butter. It is provided with an external annular shoulder $a$ at its top. B is a companion earthenware vessel of about the same capacity, and differing from vessel A in that it is provided with a flange $b$, set inwardly, so that when the vessels are brought together such flange may enter within vessel A, as clearly indicated. Outside of this flange is the annular ledge or seat $c$, between which and the top of vessel A is placed the rubber gasket or packing C. Vessel B is also preferably provided with an inwardly-projecting rim, as at $d$, which, as vessel B is intended to be inverted when the vessels are put together, will serve to prevent the butter which may be in vessel B from slipping out. Vessel B is also provided with an exterior annular shoulder $e$, as shown.

To secure the two vessels together so as to form a single package, I employ a wire fastening which is adapted not only to unite the vessels, but to secure a compression of the interposed gasket C, and thereby to render the package air-tight. This fastening I make as follows: The wire band $f$ encircles vessel B and rests upon the shoulder $e$, and arms or levers F, one at either side, are loosely secured in eyes $g$ in the band $f$. The other ends of said arms F are bent to form hooks which are readily insertible in eyes $h$ in the lever-swinging frame H. Said lever-frame is fulcrumed at its ends in eyes $i$, formed in the band $j$, encircling vessel A and lying against shoulder $a$. By depressing the swinging lever-frame to the position shown at Fig. 1 the fastening is tightened, so as to bring the vessels together and secure a very considerable pressure upon the gasket. When it is desired to detach the vessels, said frame is raised to the reverse of said position, or thereabout, and thereby freedom is obtained to detach the arms F from the eyes of said frame and to wholly release the fastening. The upper vessel can now be lifted off and butter used therefrom. It can of course be immediately replaced and the fastening tightened as before, so that the contents remain excluded from the outer air.

My package is very simple and inexpensive, and it will keep its contents unimpaired so long as the fastening is undisturbed.

I claim—

The butter-package consisting of the two earthenware vessels, each adapted to contain butter and also adapted to enter one within the other, a rubber gasket or packing interposed between the horizontal meeting edges of the vessels, and a detachable wire fastening for uniting the vessels, said fastening having a swinging frame H, adapted to produce an active compression of the packing, substantially as set forth.

CHARLES F. HILL.

Witnesses:
JAS. E. BRETT,
MARION H. BRETT.